March 25, 1952 P. GIUFFRIDA 2,590,604
MOVIE PROJECTOR SAFETY DEVICE
Original Filed Nov. 1, 1946 3 Sheets-Sheet 2
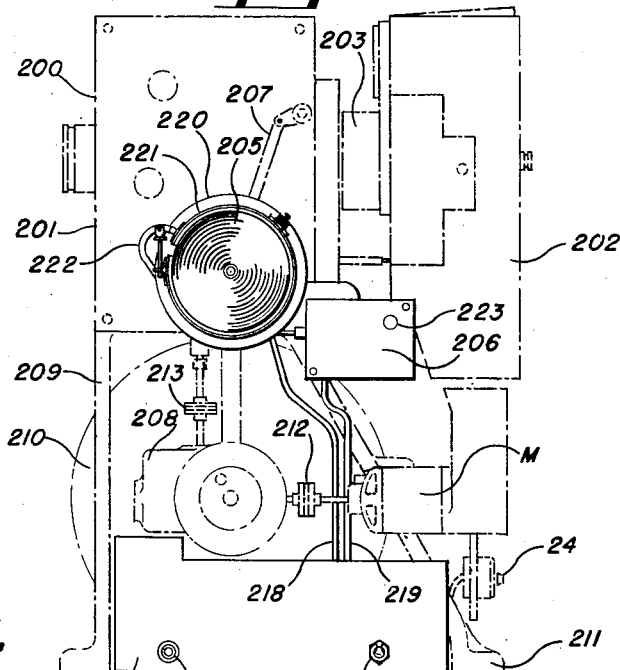
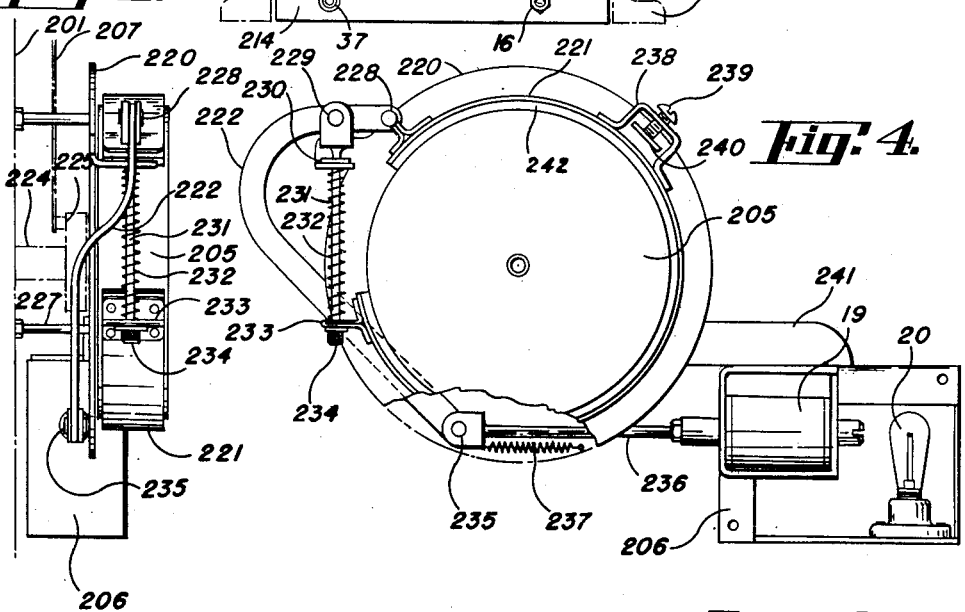
*Inventor*
PHILIP GIUFFRIDA
*By* M C Metcalf
AGENT March 25, 1952  P. GIUFFRIDA  2,590,604
MOVIE PROJECTOR SAFETY DEVICE
Original Filed Nov. 1, 1946  3 Sheets-Sheet 3
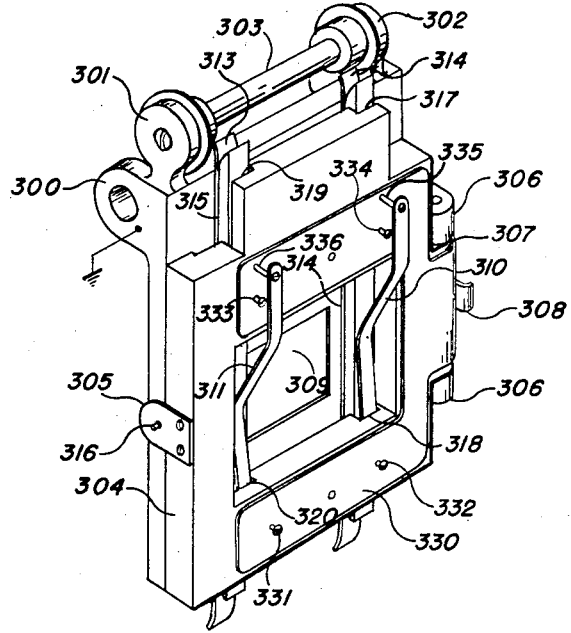
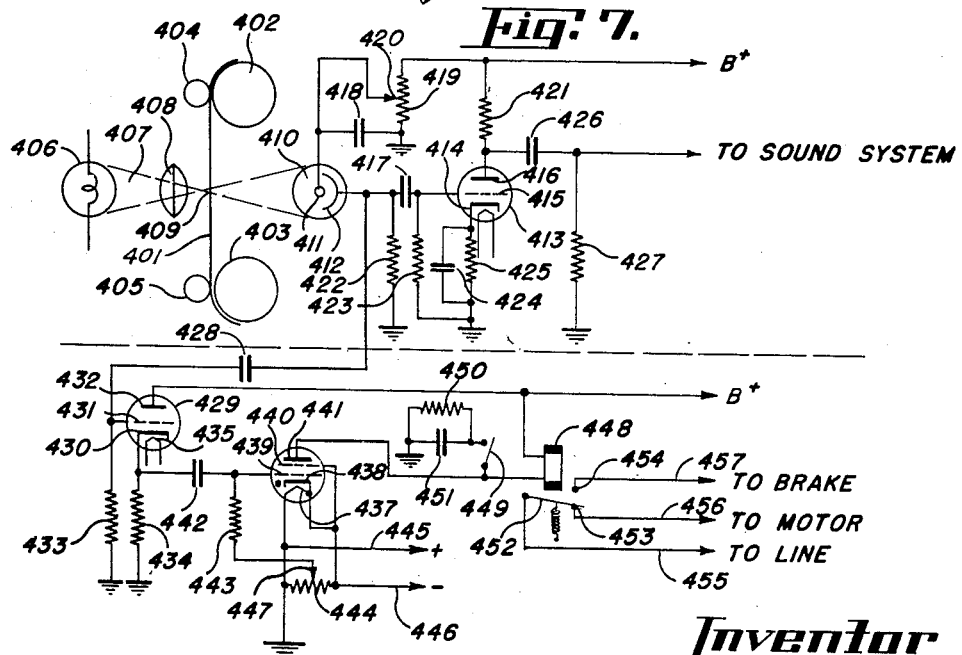
Inventor
PHILIP GIUFFRIDA
By M C Metcalf
AGENT Patented Mar. 25, 1952

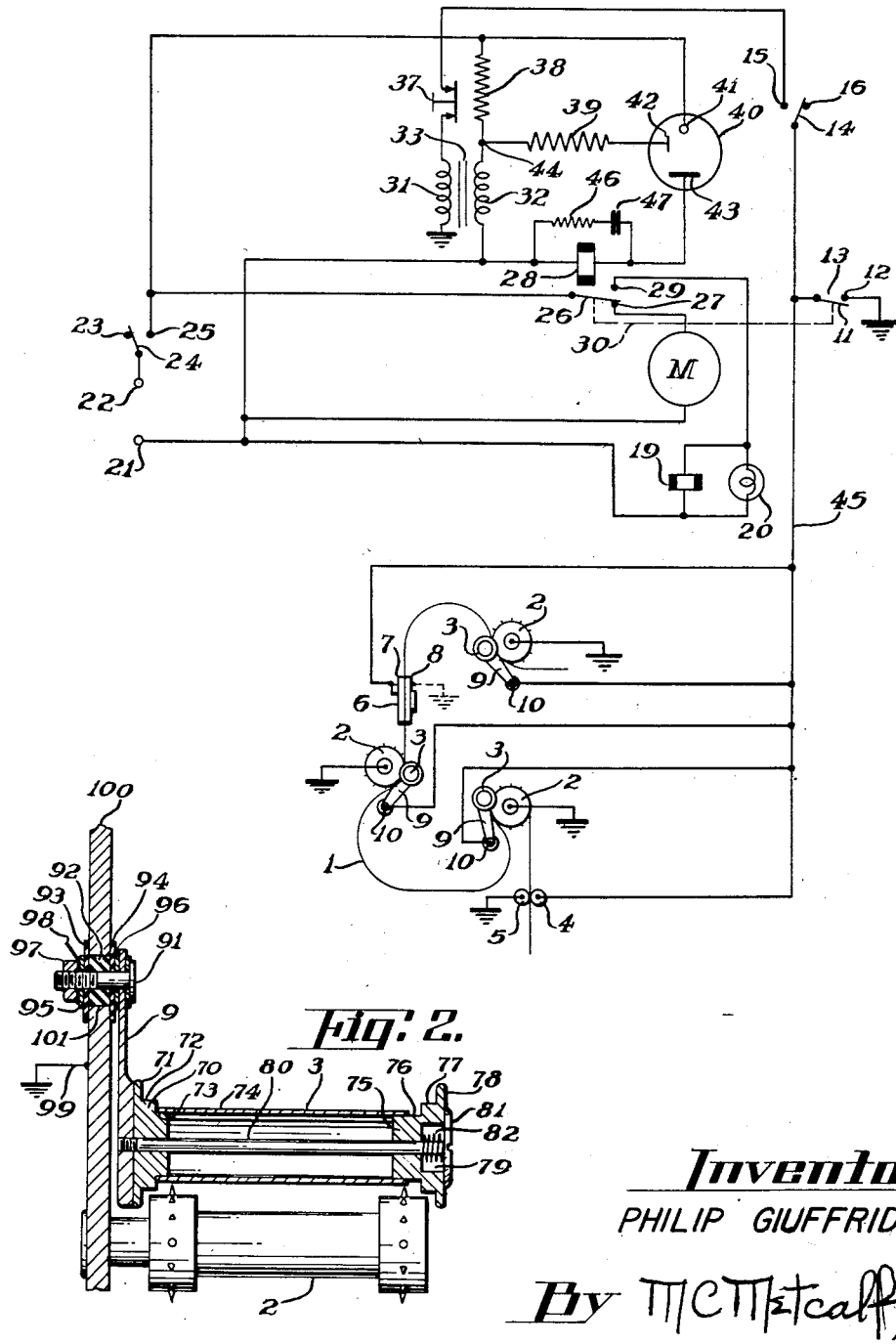

2,590,604

UNITED STATES PATENT OFFICE 2,590,604

MOVIE PROJECTOR SAFETY DEVICE

Philip Giuffrida, Lawrence, Mass., assignor to Photoswitch Incorporated, Cambridge, Mass., a corporation of Massachusetts Original application November 1, 1946, Serial No. 707,107. Divided and this application June 10, 1948, Serial No. 32,193

3 Claims. (Cl. 88—17)

This invention relates to the detection of film breakage in motion picture projectors, this being a division of the inventor's co-pending application, Serial No. 707,107, filed November 1, 1946, now Patent No. 2,566,187, issued August 28, 1951.

The type of film now in use for commercial motion picture projection is highly inflammable and in burning gives off gases which may, under certain conditions, become explosive. The film must be projected by a powerful and concentrated light for satisfactory reproduction on a screen of the average theatre size. When the projector is in normal operation, the film moves past the illuminating aperture so rapidly that no damage is done by the intense heat which the light source emits. If a jam or break occurs, however, the film remaining in the gate will catch fire unless the light from the projection lamp is immediately cut off. Commercial projectors are provided with a fire shutter which the operator can swing into place between the projection light and the film upon film breakage, but constant vigilance on the part of the operator is required if the shutter is to be operated and the projector shut off quickly enough to prevent fire. The devices heretofore proposed for automatic film break detection have generally been rejected by professional motion picture operators partly, because such devices have employed separate switches which increase the number of operations required to thread the film, so that the inconvenience and loss of time occasioned far outweighs the gain in safety, and partly because the switches are so constructed, and the currents interrupted of such a magnitude, as to cause sparking, which is in itself a fire hazard.

The object of this invention is to provide a device which operates the control switches of the fire shutter and projector, upon film breakage, with a minimum loss of time, which permits threading of the film in the normal way without additional operations, which eliminates all danger from sparking, which is positive and reliable in operation, and which can be readily applied to any of the present commercial projectors, as it requires only minor modifications to the existing structure.

The invention consists in general of an electronic relay used in cooperation with a number of break detecting elements which supervise the passage of the film at various points in its normal path. The output current of the relay may be employed to initiate suitable safety operations, such as shutting off the projector current, applying a brake to the flywheel, and moving the fire shutter into place. Some of the detecting devices are mechanical switches in which the contacts are normally held apart by the peripheral border of the film which passes between them. The detecting switches are constructed by making a few minor modifications and additions to the existing sprockets and gate through which the film normally runs. The most important points of detection are at the sprocket before the gate and at the gate itself, as breakage is most likely to occur in this location because of the strain put on the film by the intermittent motion. Breakage may also be detected at any of the other sprocket and idler roll locations. The switch contacts are so constructed as to engage only the border of the film, thus eliminating the danger of accidental contact through the sprocket holes. In one embodiment of the invention, suitable for sound projectors, the sound photocell is employed to give a signal of film breakage without interfering with normal sound reproduction.

The mechanical details of the various switch structures are claimed in the copending application previously referred to herein.

Other advantages and novel features not already set forth will be apparent from the following description. In the accompanying drawings:

Fig. 1 illustrates in electrical and mechanical scheme one embodiment of the invention;

Fig. 2 illustrates a guide roller switch of Fig. 1 in greater detail, the guide roller being illustrated in longitudinal section to show its construction;

Fig. 3 illustrates one type of movie projector and parts of the invention attached thereto;

Fig. 4 is an enlarged illustration of the braking mechanism shown in Fig. 3;

Fig. 5 is an end view of the braking mechanism of Fig. 4;

Fig. 6 illustrates in detail a film gate switch as set forth in Fig. 1; and

Fig. 7 illustrates in electrical scheme another embodiment of the invention.

Fig. 1 shows in electrical and mechanical scheme one embodiment of the invention, with only those parts of the projector mechanism shown which directly cooperate in the operation of the invention, the projector body, lenses, light sources, shutter, and operating mechanism having been omitted as not being pertinent. The parts of the projector which are shown in Fig. 1 are variously modified, as will be explained below, to perform the additional function of electric switches while at the same time retaining their original character as projector parts. These modified standard components are shown in the bottom part of Fig. 1 in approximately the same configuration as such components would be found in a standard movie projector.

As in any standard projector, the movie film 1 is moved along its path by sprocket wheels 2 with guide rollers 3, which are mounted on one end of crank arms 9 each of whose other end at 10 is mounted on the projection mechanism housing (not shown) but electrically insulated therefrom, as will be explained below. The crank arms 9 customarily have spring means (not shown) for holding the guide rollers 3 adjacent to the sprocket wheels 2 and thereby tending to hold the film 1 in engagement with the sprocket wheels 2. Each guide roller 3 and sprocket wheel 2 combination constitutes an electrical switching device, as shown in greater detail in and described with respect to Fig. 2. The sprocket wheels 2 are grounded to the frame of the projector (Fig. 2) and the guide rollers 3 are connected in parallel through the respective crank arms 9 to a common wire 45.

The gate is also an electrical switch, as shown in detail in Fig. 6, and described below with reference thereto. The gate has two contact blades 7 and 8, with one blade 7 connected in parallel with the guide roller 3 to wire 45, and the other blade 8 connected to ground.

The guide rollers 4 and 5 between which the film 1 passes in leaving the projector mechanism may form another switching device with roller 5 connected to ground and roller 4 connected to wire 45 also in parallel with the rollers 3. These rollers may be of a standard type with roller 4 insulated by standard methods from the projector housing (not shown) and urged by light spring means (not shown) into electric contact with each other but held from such contact by the film 1 when it is passing therebetween. Alternatively, roller 4 may be of construction similar to guide roller 3 as described below with reference to Fig. 2.

Wire 45 leads to a glow discharge tube electronic relay of the type described in the United States Patent No. 2,352,240 to Wolfner, dated June 27, 1944, comprising a glow discharge tube 40 of which the cathode 41 is connected through an appropriate power control switch 23 to a supply terminal 21. The anode 43 is connected through an electromagnet 28 to the other supply terminal 21. The starting electrode 42 is connected through a resistor 39 to a point 44 on a voltage divider network connecting a resistor 38 and a primary winding 32 of a transformer 33 connected in series with point 44 between them, and with resistance 38 connected to the cathode 41 and the primary winding 32 to the anode supply terminal 21. The secondary winding 31 of transformer 33 is connected at one side through a normally closed push button test switch 37 and through a unit control switch 16 to wire 45, and at the other side to ground. A condenser 47 and a resistor 46 are connected in series across the electromagnet 28.

Electromagnet 28 operates a single-pole double-throw relay switch 30 having two contacts 27 and 29, and a switch armature 26. The operating motor M for the projector is connected between contact 27 and supply terminal 21. The switch armature 26 is connected through power switch 23 to the other supply terminal 22. A latching relay switch 13 is linked to switch armature 26 and has a switch blade 11 connected to wire 45 which is closed on grounded contact 12 when switch armature 26 is closed on contact 29.

A solenoid 19 for operating a brake and other safety devices (not shown) is connected between supply terminal 21 and switch contact 29 and has connected in parallel thereto a warning light 20.

The apparatus according to Fig. 1 is placed in operating condition by threading the film 1 as in a standard movie projector through the sprocket wheels 2 and guide rollers 3, film gate 6, and guide rollers 4 and 5, the film when threaded holding apart the switch contacts of guide rollers 3 and sprocket wheels 2 and film gate 6, as explained in detail below with respect to Figs. 2 and 6, as well as rollers 4 and 5. The unit switch 16 is closed, the latch switch 13 is normally open, and push button test switch 37 is normally closed. Normally, the electromagnet 28 is de-energized (as will be explained below) and the relay switch 26 connects switch armature 26 to contact 27. To start operation the switch 23 is closed, causing power to be supplied to the motor M through circuit 22—24—25—26—27—M—21 and causing the power source at terminals 22 and 21 to be impressed on the anode 43 and cathode 41 of tube 40 through electromagnet 28 and on the voltage divider network consisting of resistor 38 and transformer primary 32. Since the secondary winding 31 of the transformer 33 is connected in circuit ground

—31—37—16—14—45—10—9—32— ground which is held open by the presence of the film 1 between guide roller 3 and sprocket wheel 2, the circuit of the secondary winding is open, and the impedance of the primary 32 is relatively high. The resistance 38 is of such value that under this condition the potential at point 44, which is impressed on starting electrode 42, is such that the tube 40 is non-conductive, so that no current flows through electromagnet 28. Thus the switch armature 26 is left in its normal position connecting the projector motor M to the power source. The detecting circuits including the switches may be coupled to the input circuit of tube 40 in other well-known ways, for example, by direct connection between the grid and anode, but the inductive coupling shown is preferable as it blocks current surges which might be harmful to the tube.

If during the operation of the projector the film 1 should break, permitting any one of the parallel connected switches to close the circuit ground

—31—37—16—14—45—10—9—32— ground, (or the equivalent circuit through the gate 6 or rollers 4—5) the low impedance of the now closed circuit of the secondary winding 31 would be reflected through transformer 33 to the primary 32, permitting the potential at point 44 and consequently of the starting electrode 42 to increase beyond the starting point determined by the characteristics of tube 40, and causing current to flow through tube 40 and through electromagnet 28. The electromagnet 28 immediately pulls switch armature 26 from contact 27 to contact 29, breaking the supply of power to the projector motor M and closing circuit

22—24—25—26—29—19—21 causing power to flow through solenoid 19, to operate any desired type of safety device (not shown) such as, for example, a mechanical brake on the flywheel of the projector mechanism (Figs. 3, 4, 5) and a safety shutter to interrupt the light entering the film gate in the projector mechanism.

Also, when electromagnet 28 is energized, it closes the latching switch 13 so as to connect wire 45 to ground. Since the latching switch 13 is connected in parallel to the switches in the projector, it serves to hold the projector inoperative once it has been stopped as explained above by film breakage.

From the foregoing description it is clear that it is immaterial to the operation of the apparatus how many switching devices are located along the path of the film 1, since the operations of any one or more of the switches will trigger the tube 40. It is desirable, however, to locate a plurality of switches variously throughout the projector, the more quickly to detect film breakage.

The normally closed push button switch 37 may be used to open momentarily the shorted circuit containing the transformer secondary winding 31 in order to stop the discharge through tube 40 and to render the projector operative momentarily, to feed film for rethreading, or to test the safety system for a defective discharge tube 40.

After the film is rethreaded in order to restart the projector, the normally closed push button switch is opened momentarily to reset the electronic relay.

Referring now to Fig. 2, there is shown in detail a safety switch of the type comprising the modified guide roller 3 and sprocket wheel 2. The guide roller 3 includes the end piece 70 having a flange 71, a step 72 to hold the film and a lower step 73 to hold the cylindrical body 74 of the roller. At the other end of the roller is end piece 75 having a lower step 76 which has a sliding fit within the body 74, a higher step 77 like step 72 to hold the film, and a flange 78. A recess 79 in end 75 is provided. End pieces 70 and 75 revolve about an axle 80, one end of which is attached to crank arm 9, and the other end has a flanged portion 81. In the recess 79 of end 75 is a coil spring 82 around the axle 80 which tends to force end 75 away from flange 81 toward body 74 and the opposite end piece 70.

The other end of crank arm 9 is pivotally mounted on the housing 100 of the projector, in the same manner as in a standard projector except that it is insulated therefrom. The mounting bolt 91 passes through an insulating bushing 92, in a hole 101 in the housing 100, with insulating washers 93 and 94 on each side thereof next to the housing 100 under metal washers 95 and 96, and has a holding nut 97 to hold the entire assembly together. Connection for wire 45 of Fig. 1 is made to a lug 98 mounted just under nut 97. Sprocket wheel 2 is mounted as is customarily done in any standard movie projector to the housing 100, it being necessary only to make certain that there is good electrical contact between the parts of the sprocket wheel and the housing 100, which is grounded by wire 99.

The switch of Fig. 2 operates as follows: The film 1 (not shown in Fig. 2) passes over sprocket wheel 2 with the guide roller 3 holding it under the urging of the aforementioned spring tension of arm 9 with one edge of the film in engagement with flange 71 and the other edge with flange 78, the film thereby holding movable end 75 outward toward the flange 81, and placing the spring 82 under compression. The movable end 75 of the split guide roller 3 is in this manner held away from the sprocket wheel 2 by the film.

When the film breaks or leaves the sprocket wheel 2 and guide roller 3, the movable end 75 of the roller 3 is no longer held away from sprocket wheel 2; the spring 82 pushes movable end 75 toward fixed end 70 until flange 78 hits sprocket wheel 2, thereby completing an electrical circuit 98 — 91 — 9 — 80 — 75 — 2 — 100 — 99—ground.

Fig. 3 shows one type of standard movie projector 200 having safety devices in accordance with the invention mounted thereon. Fig. 4 shows an enlarged plan view of the flywheel 205 and braking mechanism together with a housing 206 for the solenoid 19 with the cover off, showing the solenoid 19. Fig. 5 is an end view of the apparatus shown in Fig. 4. The apparatus of Figs. 3, 4, and 5 is described below. The standard movie projector flywheel 205 is mounted on axle 224 projecting from a wall of the projector housing 201. On the axle 224 is mounted a standard centrifugal device 225 which is linked by mechanical linkage 207 to the safety shutter (not shown) in the housing 201 and which, when axle 224 is not turning with sufficient speed, puts the safety shutter by means of linkage 207 into the path of the projection light which is directed from the light source housing 202 through the condenser lens system contained in lens holder 203 into the projector mechanism housing 201. Rods 226 and 227 mounted on housing 201 support the brake mounting 220 which has brackets 230 and 240 to hold the movable parts of the brake mechanism. The brake band 221 forms a broken circle around the flywheel 205, has a brake lining 242 on the inside, and a substantially U-shaped bracket 238 with a hole in the cross-arm thereof in which is disposed a bolt 239 which is threaded into bracket 240. The bolt 239 is not mechanically fixed to the bracket 238, being of smaller diameter than the hole. One end of the brake 221 has mounted thereon a bracket 228 which is attached by a hinge connection to an end of a curved brake linkage 222, the other end of which is attached by a hinge connection to the connector 235 on the end of an actuator rod 236 which protrudes from and is actuated by the solenoid 19 in the housing 206. On the linkage 222 near the end mounted on bracket 228 is a pin connection to a connector 229 on one end of a straight rod 231 which passes through a bracket 230 on the brake mounting 220, and through a second bracket 233 on the opposite end of the brake band 221, and which has on its opposite (lower) end a knurled adjusting nut 234.

A tension spring 237 is attached to connector 235 and the back side of brake mounting 220 and is effective to pull solenoid rod 236 into the solenoid 19. A compression spring 232 around the straight rod 231 pushes bracket 233 away from bracket 230. Springs 232 and 237 cooperate to hold the brake band 221 in released (non-braking) position.

When the solenoid 19 is energized, the solenoid rod 236 pushes out against the tension of the tension spring 237, causing the brake band 221 and its brake lining 242 to press against the flywheel 205 through linkage 222 and bracket 228. The movement of the linkage 222 causes the bracket 229 to pull the straight rod 231 and the brakeband bracket 233 upward against the compression of spring 232, thereby tightening the brake band 221 about the flywheel 205.

The solenoid housing 206 has on the cover a glass window 223, through which the signal light 20 is visible.

The projector motor M drives the projector 200 through a first shaft linkage 212, gear box 208 and a second shaft linkage 213. The main switch 24 is mounted below the motor M. A suitable box 214 contains the electronic relay mechanism shown in Fig. 1, with push button 37 and toggle switch 16 of Fig. 1 mounted on the cover.

In standard operation, after the film is threaded the unit switch 16 is turned on and the main switch 24 is then turned on. If the projector is in condition for proper operation, solenoid 19 is de-energized, the brake on flywheel 205 is in released position, and the motor M will operate the projector 200. If the film should break, one or more of the safety switches (Fig. 1) cause the electronic relay to operate, shutting off the power to the motor M and energizing the solenoid 19, thereby braking the flywheel 205. When the flywheel 205 slows down and stops, the centrifugal mechanism 225 on shaft 224 causes the safety shutter (not shown) to drop through linkage 207, cutting off the light in the projector housing 201.

During the rethreading operation, push button 37 may be pressed to render the electronic relay temporarily inoperative, in order that a few feet of film may be fed through the projector mechanism.

Fig. 6 shows a film gate switch which also may be used in the invention in the manner shown in Fig. 1. The body 300 is of a metallic material, is connected to ground, has a pair of brackets 301 and 302 to hold a film spool 303, and a film aperture 309 through which passes the light from the projection lamp (not shown). Two metal strips 313 and 314 are mounted on and in good electrical contact with the body 300 along the edges of the path of the film (not shown). The movable portion 304 of the film gate is made of insulating material, and has hinge projection 307 by which it is mounted on hinge brackets 306 on the body 300 of the gate. Normally the hinged portion 304 is closed on the body 300, with bracket 305 held by the spring catch 316 on the body 300. Two electrically conductive bars 312 and 315 are mounted on the hinged portion 304 in recesses 317 and 318, and 319 and 320, respectively, so that in the absence of film they rest on the strips 314 and 313, respectively, on the body 300. Electrically conductive spring strips 310 and 311 push the bars 312 and 315, respectively, against the strips 313 and 314, respectively, and are in electrical contact with the bars 312 and 315. The spring strips 310 and 311 are attached to the hinged portion 304 by mounting pins 335 and 336, respectively, which make electrical contact with a metal plate 330. Mounting screws 331, 332, 333, and 334 secure the metal plate 330 to the hinged portion 304. A spring contact 308, which is connected to wire 45 of Fig. 1, makes electrical contact with the metal plate 330.

In normal operation, the movie film 1 (Fig. 1) travels over the spool 303 between the body 300 and the hinged portion 304 of the film gate as in any standard movie projector, with, however, the switch bars 312 and 313 riding under the spring tension of the spring strips 310 and 311 on the extreme border of the movie film so that they are held by the movie film from contact with contact strips 313 and 314. A break in the movie film will result in the film leaving at least a portion of its path through the film gate switch of Fig. 6, thereby permitting switch bars 312 and 315 to be forced into contact with contact strips 314 and 313 at one or more points completing circuit from ground through the connecting strips 314 and 313, switch bars 312 and 313, tension springs 310 and 311, mounting pins 335 and 336, plate 330 and contact spring 308 to wire 45 of Fig. 1.

Fig. 7 shows a schematic diagram of another embodiment of the invention using photoelectric switching means. As in a standard sound movie projector, the film 401 passes over spools 402 and 403 with guide rollers 404 and 405, respectively, holding the film 401 on the spools. A lamp 406 directs a beam 407 of light through a lens system 408 and through a spot 409 on the sound track of the moving film 401 to a photocell 410, having an anode 411 and a cathode 412 which are connected in a standard sound amplifying circuit.

The cathode 412 is connected to the control grid 415 of a standard electron tube 413 through a coupling condenser 417. The anode 411 is connected to a source of anode (B+) voltage through a potentiometer 419 by way of the movable tap 420 thereof. A capacitor 418 provides the usual by-pass to ground. The B+ supply is also connected to anode 416 of the amplifier tube 413 through a plate load resistor 421. The amplifier tube 413 is energized by the photocell 410 in a well-known fashion and in turn energizes the remainder of the sound reproduction system (not shown).

An electronic relay is coupled to the cathode 412 of phototube 410 through a capacitor 423. The control grid 431 of an input electron tube 429 is connected to the capacitor 428, and through a resistor 433 to ground. The anode 432 of the input tube 429 is connected to a suitable anode potential source (not shown) and the cathode 430 thereof is connected to ground through a resistor 434. A discharge tube 436, which may be a four-element gaseous discharge tube, has its control grid 439 thereof connected through a capacitor 442 to the cathode 430 of the input tube 429 and through a resistor 443 to ground and the gas tube cathode 438. The suppressor grid 440 and cathode 438 are together connected to the heater 437, which is supplied with D. C. power in a conventional fashion through supply lines 445 and 446, line 445 being positive and line 446 being negative. A resistor 444 having a tap 447 which is connected to ground is connected in parallel with the heater 437. One side of the resistor 444 is also connected to ground. The anode 441 of the gaseous discharge tube 436 is connected through a relay magnet 448 to the same potential source, as the anode 432 of the input tube 425. A test switch 449 may be used to connect the gas tube anode 441 through a resistor 430 and a capacitor 451 in parallel to ground. The electromagnetic relay magnet 448 operates a switch armature 452, the pivotal end of which is connected to a source of electric power (not shown) through wire 455. The other end of the armature 452 is held by suitable means, such as a spring, in electrical contact with a tap 453 and thereby to a wire 456 leading to the projector motor, when the magnet 448 is de-energized. When the magnet 448 is energized, the switch armature 452 is pulled away from connection with contact 453 and into connection with contact 454 which is connected to the brake solenoid 19 as in Fig. 1, or to any other safety control means as may be desired.

In normal operation, when the movie film 401 is passing properly through the projector, the spot 409 is properly moving along the sound track and phototube 410 operates in conjunction with the sound amplifier tube 413 and the circuit of the sound system, as it would be in a standard sound movie projector. The setting of tap 447 on resistor 444 can be varied in order to vary the bias of cathode 438 of tube 436, thereby varying the sensitivity of the circuit to fluctuations greater than normal in phototube 410. But should the film 401 break, the sound track would not remain in the beam 407 at the spot 409, and the full power of the light beam 407 would strike the phototube 410, resulting in a large surge of current through the phototube 410. This results in a relatively large rectangular pulse of voltage being impressed on the control grid 431 of the relay input tube 429, through resistor 433 and condenser 428, substantially increasing the conductivity of the tube 429. The increase in current through the input tube 429 causes more current in the cathode resistor 434, resulting in an increase in positive voltage across the resistor 434, and a higher positive voltage on the control grid 439 of the gaseous discharge tube 436, causing it to conduct electric current. This current flows through the relay magnet 448, energizing it, and causing the switch armature 452 to break contact with motor tap 453, opening the motor circuit, and to make connection with the solenoid tap 454, closing the circuit to the brake solenoid or other safety control devices.

In order to reset the apparatus for operation after stopping, test switch 449 is closed, thus causing the current from the anode supply line to surge into condenser 451, reducing the potential on the plate 441 of the gas tube 436 below the point at which it is conductive. Then the test switch 449 is opened, again putting the full positive potential on the anode. If the film 401 has been rethreaded properly, the potential on the grid 439 of the gas tube 436 will be below the discharge potential and there will be no current through the gas tube 436.

Since many changes not herein specifically referred to may be made in the above-described article and different embodiments of the invention could be made without departing from the scope thereof, it is intended that all matters contained in the above description or shown in the accompanying drawings shall be interpreted as illustrative only and not in a limiting sense.

What is claimed:

1. In combination with a motion picture projector having a photoelectric target for receiving a light beam from a source modulated in accordance with the characteristics of an intervening film sound track whereby a sound amplifier is operated, an improved safety device which comprises an alternating-current amplifier having an input and output circuit, said input circuit being connected between the output of said photoelectric target and the input of said sound amplifier, said output circuit including a gas tube and a safety control relay for initiating emergency action upon film breakage, said relay being operated by current flow in an anode-cathode space path of said gas tube, and an adjustable biasing network connected to said gas tube and being so adjusted that the amplitude of the alternating-current impulses generated by said photoelectric target in response to the modulation of said light beam by said film sound track is insufficient to discharge said gas tube whereas the initial impulse generated by said photoelectric target in response to the absence of said intervening film from between said photoelectric target and said light source due to breakage is sufficient to overcome said bias and discharge said gas tube whereby said relay is operated thereby initiating an emergency action in response to film breakage.

2. In combination with a motion picture projector having a photoelectric target for receiving a light beam from a source modulated in accordance with the characteristics of an intervening film sound track whereby a sound amplifier is operated, an improved safety device which comprises an alternating-current amplifier having an input and output circuit, said input circuit being connected between the output of said photoelectric target and the input of said sound amplifier, said output circuit including a gas tube and a safety control relay for initiating emergency action upon film breakage, said relay being operated by current flow in an anode-cathode space path of said gas tube, an adjustable biasing network connected to said gas tube and being so adjusted that the amplitude of the alternating-current impulses generated by said photoelectric target in response to the modulation of said light beam by said film sound track is insufficient to discharge said gas tube whereas the initial impulse generated by said photoelectric target in response to the absence of said intervening film from between said photoelectric target and said light source due to breakage is sufficient to overcome said bias and discharge said gas tube whereby said relay is operated thereby initiating an emergency action in response to film breakage, and a reset circuit for restoring said safety device to its initial operating condition including an impedance network for grounding said safety control relay and the anode of said discharge tube through said network whereby the master relay is released and said discharge tube is extinguished.

3. In combination with a motion picture projector having a photoelectric target for receiving a light beam from a source modulated in accordance with the characteristics of an intervening film sound track whereby a sound amplifier is operated, an improved safety device which comprises an alternating-current amplifier having an input and output circuit, said input circuit being connected between the output of said photoelectric target and the input of said sound amplifier, said output circuit including a gas tube and a safety control relay for initiating emergency action upon film breakage, said relay being operated by current flow in an anode-cathode space path of said gas tube, an adjustable biasing network connected to said gas tube and being so adjusted that the amplitude of the alternating-current impulses generated by said photoelectric target in response to the modulation of said light beam by said film sound track which is normally disposed thereto is insufficient to discharge said gas tube whereas the initial impulse generated by said photoelectric target in response to the absence of said intervening film from between said photoelectric target and said light source due to breakage is sufficient to overcome said bias and discharge said gas tube whereby said relay is operated thereby initiating an emergency action in response to film breakage, and a reset circuit for restoring said safety device to its initial operating condition including an impedance network for grounding said safety control relay and the anode of said discharge tube through said network whereby the control relay is released and said discharge tube is extinguished.

PHILIP GIUFFRIDA.

(References on following page)

REFERENCES CITED

The following references are of record in the file of this patent:

UNITED STATES PATENTS

| Number | Name | Date |
|---|---|---|
| 1,476,006 | Phimister | Dec. 4, 1923 |
| 1,799,154 | Brook | Apr. 7, 1931 |
| 1,842,658 | Cohen et al. | Jan. 26, 1932 |
| 1,945,682 | Fenner et al. | Feb. 6, 1934 |
| 1,988,980 | Debrie | Jan. 22, 1935 |
| 2,101,121 | Wixon | Dec. 7, 1937 |
| 2,116,314 | Jenkins et al. | May 3, 1938 |
| 2,447,238 | Edmonston | Aug. 7, 1948 |

FOREIGN PATENTS

| Number | Country | Date |
|---|---|---|
| 424,220 | Great Britain | Feb. 18, 1935 |